US008683565B2

(12) United States Patent
Backlund (10) Patent No.: US 8,683,565 B2
(45) Date of Patent: Mar. 25, 2014

(54) AUTHENTICATION

(75) Inventor: Kjell Backlund, Jorvas (FI)

(73) Assignee: Emillion Oy, Helsinki (FI)

( * ) Notice: Subject to any disclaimer, the term of this patent is extended or adjusted under 35 U.S.C. 154(b) by 607 days.

(21) Appl. No.: 12/299,021

(22) PCT Filed: May 2, 2007

(86) PCT No.: PCT/FI2007/050241
§ 371 (c)(1),
(2), (4) Date: Oct. 30, 2008

(87) PCT Pub. No.: WO2007/125180
PCT Pub. Date: Nov. 8, 2007

(65) Prior Publication Data
US 2010/0024019 A1    Jan. 28, 2010

(30) Foreign Application Priority Data
May 3, 2006  (FI) ...................................... 20065288

(51) Int. Cl.
*G06F 7/04*    (2006.01)
(52) U.S. Cl.
USPC ................ 726/7; 713/170; 713/189; 709/225
(58) Field of Classification Search
USPC .......................................................... 726/7
See application file for complete search history.

(56) References Cited

U.S. PATENT DOCUMENTS

| | | | |
|---|---|---|---|
| 6,205,480 B1 * | 3/2001 | Broadhurst et al. .......... 709/225 |
| 6,681,330 B2 | 1/2004 | Bradford et al. | |
| 6,892,307 B1 | 5/2005 | Wood et al. | |
| 2002/0147927 A1 * | 10/2002 | Tait ................................ 713/201 |
| 2002/0184507 A1 | 12/2002 | Makower et al. | |
| 2003/0054810 A1 | 3/2003 | Chen et al. | |
| 2003/0159072 A1 | 8/2003 | Bellinger et al. | |

(Continued)

FOREIGN PATENT DOCUMENTS

| | | |
|---|---|---|
| EP | 0940960 A1 | 8/1999 |
| WO | 0239237 A2 | 5/2002 |
| WO | 03079167 A1 | 9/2003 |

OTHER PUBLICATIONS

Oasis Security Services (SAML) TC: "Oasis Security Services Use Cases and Requirments", pp. 9-10, May 2001. sml-reqs-01.

(Continued)

*Primary Examiner* — Carl Colin
*Assistant Examiner* — Syed Zaidi
(74) *Attorney, Agent, or Firm* — Ziegler IP Law Group, LLC.

(57) ABSTRACT

User authentication is based on a home network user database that authenticates users to external service providers. A user logs into home network and starts accessing the external service by clicking on a link labelled for the external service provider. The link is directed to script at a home server. The script causes the home server to obtain details related to the user from a home network user database. The home server passes information related to the user to a foreign server associated with the service provider. Based on the passed information, the foreign server grants or denies authentication of the user to the external service. If granting, the foreign server provides the home server with access data and the home server forwards the access data to the user so that the user can initialize an authorized external service session using the access data.

27 Claims, 6 Drawing Sheets

100

(56) References Cited

U.S. PATENT DOCUMENTS

| | | | |
|---|---|---|---|
| 2004/0039924 A1* | 2/2004 | Baldwin et al. | 713/189 |
| 2004/0128393 A1* | 7/2004 | Blakley et al. | 709/229 |
| 2004/0128506 A1* | 7/2004 | Blakley et al. | 713/170 |
| 2004/0193921 A1* | 9/2004 | Byrne | 713/201 |
| 2004/0250118 A1 | 12/2004 | Andreev et al. | |
| 2005/0204041 A1* | 9/2005 | Blinn et al. | 709/225 |
| 2005/0268241 A1 | 12/2005 | Lerner | |
| 2006/0020813 A1 | 1/2006 | Birk et al. | |

OTHER PUBLICATIONS

Berry, Wayne, "Sharing Cookies Across Domains," Jan. 10, 2008 <http://www.codeguru.com/csharp/csharp/cs_internet/article.php/c19417/Sharing-Cookies-Across-Domains.htm> [Sep. 4, 2012].

* cited by examiner

AUTHENTICATION

CROSS REFERENCE TO RELATED APPLICATIONS

This application is the National Stage of International Application No. PCT/FI2007/050241, International Filing Date, 2 May 2007, which designated the United States of America, and which International Application was published under PCT Article 21 (2) as WO Publication No. WO2007/125180 and which claims priority from Finnish Application No. 20065288, filed on 3 May 2006, the disclosures of which are incorporated herein by reference in their entireties.

BACKGROUND

1. Field

This disclosed embodiments relate in general to authentication. The disclosed embodiments relate particularly to method, apparatus and computer program product according to the preamble of attached claims.

2. Brief Description of Related Developments

Modern organisations, such as enterprises and associations, often provide their computer users with an access to a variety of Internet based services. These computer users may be employees, members, clients and/or other associated people. Many of those Internet based services (e.g. telephone number enquiry) may be normally cost-bearing or otherwise may require some authentication of users. Sourcing these services in larger volumes provides various advantages such as volume discounts. However, the people associated with an organisation may have to pass a first authentication to subscribe into an intranet of the organisation and then to pass a subsequent authentication again to use a third-party service.

Sometimes an entire organisation may be granted with equal rights for accessing given services, but there are often needs to differentiate the level of access rights. For instance, some sales people and secretaries may need hundreds of telephone enquiries a month whereas some researchers may not need any such service at all. This example demonstrates that one approach not always fits everyone. Conversely, services are not always authorised merely based on an enterprise Internet Protocol (IP) address or other corresponding data. Each user or group of users may instead be granted different credentials using which predetermined services are accessible to a predetermined extent. However, resulting volumes of individual passwords or other authentication mechanisms may be laborious to maintain in the organisation. In result, a single sign-on is desired to access various services.

U.S. Pat. No. 6,681,330B2 discusses methods for centralised user identity management across different computing platforms within one organisation.

U.S. Pat. No. 6,892,307B1 discusses using different authentication methods with different trust levels and providing access to all services satisfied with the trust level achieved by the authentication method used.

US2002147927A1 relates to providing secure access from an external client to internal systems after having authenticated with some common means of authentication.

US2002184507A1 describes a method for providing centrally managed single sign-on across a set of web servers.

US2003159072A1 describes a method and infrastructure for providing single sign-on and service provisioning across different networks and devices.

US2004128506A1 discloses a trust broker for chaining trust from enterprise A to enterprise B, wherein enterprise A can authenticate a user to the trust broker which again can authenticate the client further to the enterprise B for accessing a desired service. In this case, a special authentication process is required first between the enterprise A and the trust broker and next between the trust broker and the enterprise B.

US2005268241A1 further discloses a method to distribute cookies required by different outsourced service provider servers via a central authentication server after authentication to the central authentication server so that a user could be authenticated with a single login to further services. This approach may, however, also require enterprise users, for instance, to perform a second login (after logging into the enterprise intranet) to the central server of the centralised service provider.

SUMMARY

According to a first aspect of the disclosed embodiments there is provided a method in a home server for obtaining access for a user to an external service in a networked environment wherein the user has access to a client that is capable of communicating with the home server and with a foreign server, the foreign server being capable of granting access to the external service, the method comprising:
  detecting a request of the client;
  characterised by
  identifying in the request a pointer to an authentication script;
  responsive to the request, obtaining at least one detail related to the user;
  passing the at least one detail to the foreign server;
  receiving from the foreign server access data that enables the client to access the external service; and
  passing the access data to the client.

The at least one detail may comprise hashed derivative information.

The method according to the first aspect is also advantageous in that there is no need for building new servers and server federations. Instead, pre-existing hardware and software may be employed.

The request may comprise a Universal Resource Indicator (URI) or a Universal Resource Locator (URL).

The obtaining of the at least one detail may comprise accessing a database of personnel or members.

The access data may comprise at least one of the following items: a cookie, a temporary address using which an address to the service is available, and an address to the service.

The passing of the at least one detail towards the foreign server may involve sending the at least on detail all the way or at least despatching it towards the foreign server.

The method of the first aspect is very uncomplicated in that no new applications or hardware are necessarily required at the home server, which is particularly advantageous for deployment of the technology into numerous independently operated home servers.

Advantageously, different groups of users may be jointly defined based on their home network user data that includes the at least one detail. Joint definition of users enables authentication to an external service being configured based without prior definition of user profiles for each user and/or providing the third party with all of the home network's user data. Moreover, by employing home networks' user data, the authentication process is inherently based on up-to-date data. Deletion of user account, for instance, immediately prevents further access of the third party service. Likewise, changes in the position of a person in the home network, for example, can be taken into account on authenticating that person as the authentication takes the user data from the home network.

According to a second aspect of the disclosed embodiments there is provided a home server for obtaining access for a user to an external service in a networked environment in wherein the user has access to a client that is capable of communicating with the home server and with a foreign server, the foreign server being capable of granting access to the external service, the home server comprising:

means for detecting a request of the client;

characterised in that the home server further comprises:

means for identifying in the request a pointer to an authentication script and for, responsive to the request, obtaining at least one detail related to the user;

means for passing the at least one detail to the foreign server;

means for receiving from the foreign server access data that enables the client to access the external service; and means for passing the access data to the client.

According to a third aspect of the disclosed embodiments there is provided a method in a foreign server for providing access for a user to an external service in a networked environment wherein the user has access to a client that is capable of communicating with a home server and with the foreign server, characterised by the method comprising:

receiving from the home server at least one detail related to the user; and responsively providing the home server with access data that enables the client to access the external service.

According to a fourth aspect of the disclosed embodiments there is provided a foreign server for providing access for a user to an external service in a networked environment wherein the user has access to a client that is capable of communicating with a home server and with the foreign server, characterised by the foreign server comprising:

means for receiving from the home server at least one detail related to the user and for responsively providing the home server with access data that enables the client to access the external service.

According to a fifth aspect of the disclosed embodiments there is provided a computer program product comprising computer executable program code stored in a computer readable medium, characterised by the program product comprising computer executable program code adapted to cause an apparatus implement any one of the first or third aspect.

According to a sixth aspect of the disclosed embodiments there is provided a method of provisioning an apparatus with the computer program product according to the fifth aspect.

It should be appreciated that subject matter of one embodiment related to one aspect is combinable with another aspect where applicable.

The disclosed embodiments will be described, by way of example only, with reference to the accompanying drawings in which:

BRIEF DESCRIPTION OF THE DRAWINGS

In the following description, like numbers denote like parts.

DETAILED DESCRIPTION OF THE DRAWINGS

Figure 1:
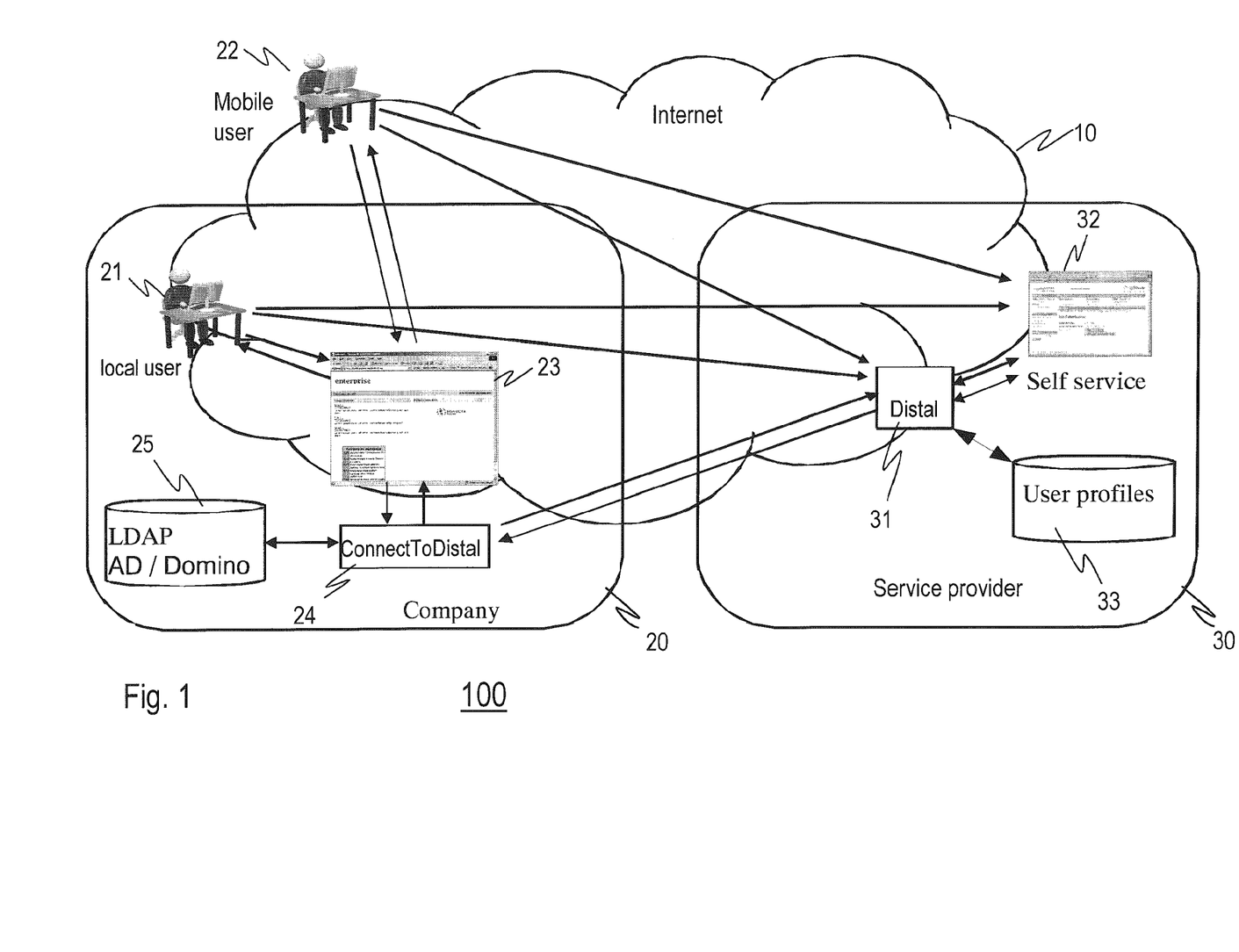
FIG. 1 shows a system according to a first embodiment.

FIG. 1 shows a system 100 according to a first embodiment. The system includes an Internet 10 denoted as a cloud, an intranet 20 and a service provider network 30, both the intranet 20 and the service provider network 30 being connected to the internet 10. The intranet 20 represents a network of an organisation such as an enterprise wherein some content may be inaccessible from the internet and only accessible to users of the intranet 20 as is known in the field of computer networks. For illustration, two clients or users are drawn, namely a local user 21 and a mobile user 22. In this context, a user refers to a person whom a service can be provided and a client generally refers to the equipment with which the user may operate. Both clients have an access to a content server 23 that is capable of providing content such as www-pages viewable with a web-browser. The content typically includes solely intranet information, mixture information with internal information and with information automatically or manually imported from outside of the intranet 20 (from public internet or from another intranet such as the external service provider's intranet 30), and some links to external sources of information and/or services.

The intranet 20 and the internet 10 may be respectively any networks (e.g. extranets) capable of connecting computers into a network of a given domain and of connecting the intranets 20 or other networks (e.g. Datanet) to common resources and other intranets.

The links to external sources may include direct links to an external service provider such as a link to www.corporation.com and links adapted to indirectly obtain an authorised access to an external source in accordance with embodiments. The latter links are better explained in connection with FIG. 2, but they generally are pointed to a script or scripts stored in an intranet script server such that on accessing the link, the script performs steps for obtaining the authorised access. The script server is typically a web server.

A script server 24 provides access to the script or scripts. The script server 24 includes a memory (not shown) that contains one or more scripts according to an embodiment. The intranet further comprises a user database 25 such as an LDAP, AD or Domino directory server which can maintain various user data such as user authentication data, job title, job position, job grade, department, age, gender and various data and entry access rights data. The user database 25 is typically accessible to human resources function of the enterprise or organisation and it thus contains fairly up-to-date information of each user. The script server 24 has an access to the user database 25 such that on receiving a request to access a script from the content server, the script server can fetch information associated with the requesting user and can communicate responsively with an external source related to the script.

The service provider network 30 includes an authorisation server denoted as Distal 31, a service providing server 32 and a user profile database 33. Generally, the authentication process of users of the intranet 20 is summarised as follows: a local user 21 or a mobile user 22 logs on the intranet using normal login procedure, typically using a static or dynamic password. After logon, the user accesses 102 a link for a service provider, which link calls a script here referred as connect-to-distal at the script server 24 (still within the intranet 20). The script receives 104 a request from the content server 23 associated with identification of the user and the external source associated with the request. The script next fetches 106 one or more particulars related to the user in question from the user database 25 and contacts 108 the authorisation server 31 of the service provider. The script supplies 110 the authorisation server 31 with the at least one particular over a normal internet communications protocol (such as HTTP or HTTPS over normal ports). The authorisation server 31 determines the company or generally organisation in question and responsively locates and maintains or creates 112 a user profile in the user profile database 33 as applicable. This determination is typically based on recognising a shared predetermined code that the script server has sent such as a shared secret (or its derivative) at the authorisation server 31. Next, the authorisation server creates data for establishing an authenticated session to the service requested by the script. The authorisation server 31 next returns 114 associated details such as an URL and cookies to the user 21 via the script server 24 by providing 116 the user 21 first with a temporary address accessing which the user can obtain 118 the URL and cookie or cookies. The script server passes the particulars to the user in question and the browser (or other data access tool) of the user to establish 120 an authenticated session in order to start using the service requested.

It is appreciated that the embodiment of FIG. 1 can establish authenticated sessions for external services with little modifications over existing systems. The script may be very light to operate—typically it does not even require maintaining state between requests. The authorisation server 31 may also operate with very brief sessions that need not last longer than fractions of second. Further still, by using ordinary Internet protocols for data exchange between the script server and the authorisation server no exceptions are normally required for passing firewalls. Moreover, the intranet need not provide its entire user database to the service provider (security risk), but instead only pre-determined part(s) of user data are handed over on demand. This not only reduces the risk of major exposure to data leaks but simultaneously provides fresh data to the service provider on each time external service is requested by any user.

It should be appreciated that in practise, various servers and functions of servers in the intranet may be freely distributed to further servers or consolidated to common servers as a matter of implementation of the disclosed embodiments within the normal skills of the person ordinarily skilled in the art.

Figure 2:
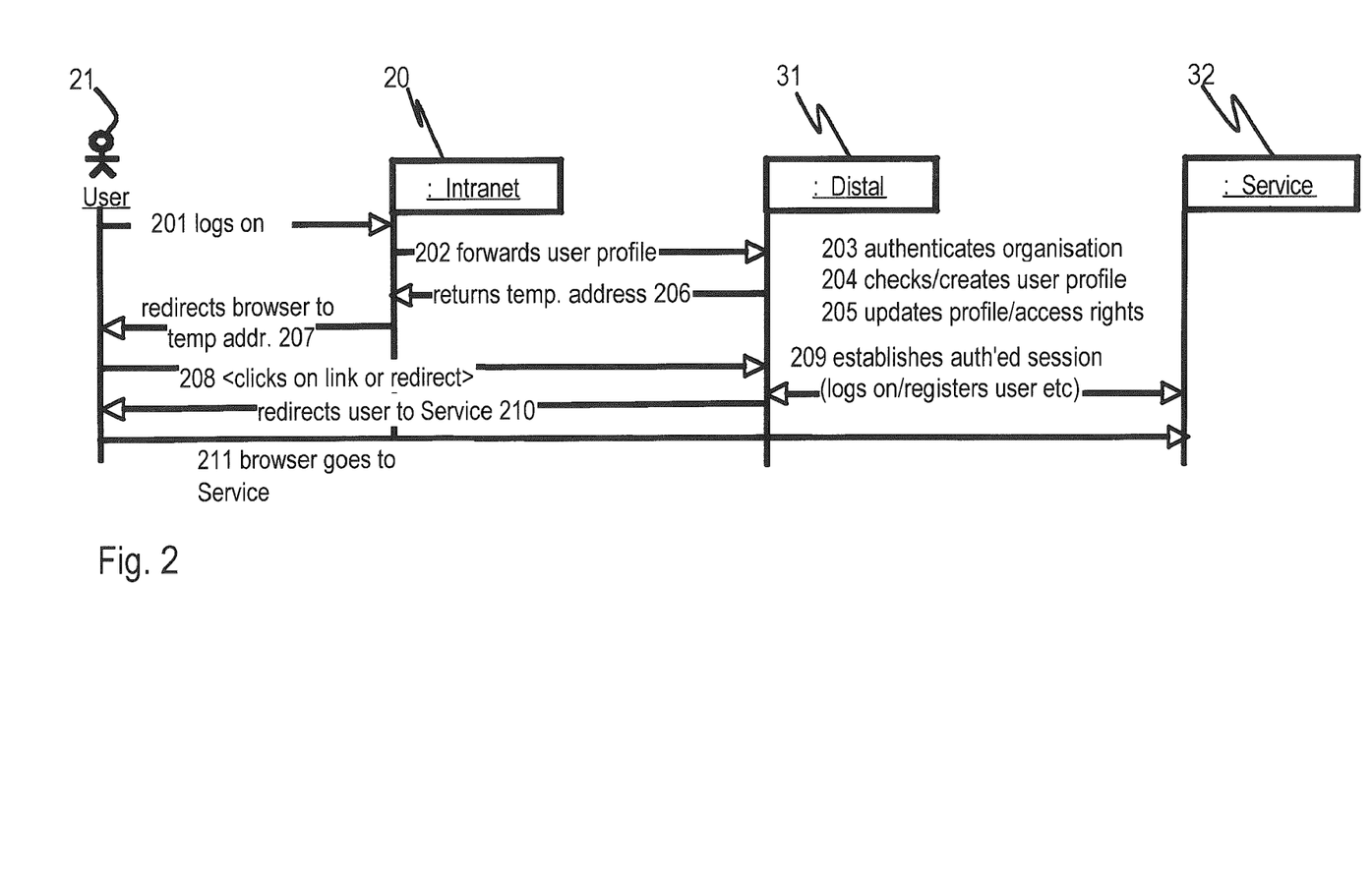
FIG. 2 shows main signalling according to an embodiment.

FIG. 2 shows main signalling according to an embodiment. In step 201, a user 21 logs on and provides authentication information to the intranet 20. On requesting a service from an external source using the script server 24, the intranet forwards (step 202) the user profile or at least one detail thereof to the authorisation server 31. The authorisation server 31 authenticates 203 the organisation from which the profile is received and checks and creates a user profile if necessary 204. The authorisation server 31 may also update 205 access rights of a user profile. On determining that the user is authorised to use the service, the authorisation server 31 returns (step 206) a temporary address to the script server 24. The script server 24 responsively redirects the browser of the user to the temporary address in step 207, either automatically or by providing the temporary address for the user to access manually. The user next access (step 208) the link and contacts the authorisation server 31 so that the authorisation server can establish (step 209) credentials for an actual authenticated session of the user. The authorisation server 31 next returns the credentials or other data (typically one or more cookies and a URL) to the user in step 210 thereby redirecting (step 211) the user's data access tool (e.g. browser) to use the service.

The profile or at least one detail of the user profile is sent in a signalling that is illustrated by the following XML-based example:

```
<?xml version=""1.0"" encoding=""UTF-8""?>
<!DOCTYPE REQUEST>
<REQUEST>
<PARAMETER key="context_reference" value="default_context"/>
<PARAMETER key="shared_secret" value="uyg4ug24Bi2u5yGuujhH2y5gu2"/>
<PARAMETER key="user_dn" value="CN=Kjell Backlund, OU=Management,
    O=Emillion, DC=emillion, DC=fi"/>
<PARAMETER key="title" value="CEO"/>
<PARAMETER key="email" value="kjell.backlund@emillion.fi"/>
<PARAMETER key="phone" value="+358400848747"/>
</REQUEST>
```

If at step 203 the user is not authorised to use the service, the authorisation server may invoke normal processes for a case of a failed authorisation, including optionally but not limited to any combination of the following: reporting the event to the claimed source intranet, reporting the event to the service provider and providing a failure message to the user via the script server 24.

The generation of the temporary address for the user enables providing the user with a cookie, because cookies are not transferable for security reasons. Cookies provide a universal and tested method for verifying the authenticity of a session.

In an embodiment data associated to the user is passed via the script server to the service provider such that the temporary address can be readily authenticated for the user and the "temporary address" will be usable for accessing the service in question. The data associated with the user may include a hash code derived from any one of the following: an identity of the user, a time stamp related to the user, a random number e.g. nonce, and any data entered by the user. However, this embodiment may require adapting the software and/or hardware in the intranet 20.

The authorisation server 31 can recognise the organisation of the user from a shared secret key contained by the profile or at least one detail of the user profile sent in step 202 so as to determine whether to authorise the external service. The same communication also advantageously, though not necessarily, contains an ID code unique within that organisation (e.g. ID number or e-mail address) based on which the authorisation server can control its user profiles stored in the user profile database 33.

It follows that the authorisation server typically creates and maintains user profiles based on the particulars supplied by the script on the script server. User profile attributes can either be mapped or determined from one or more of the particulars supplied. For instance, attributes like phone number, email address or title can usually be used directly, whereas more functional attributes like user role or access rights can be determined if the LDAP Distinguished name is among the particulars supplied. Advantageously, user profiles can be verified and updated each time a user seeks for an authorisation for using the external service. The authorisation is based on fresh data received from the script server and each authorisation can be up to date without frequent centralised data transfer from the user database 25 to the service provider.

Moreover, since the user profiles are created 204 by the distal 31 when not yet present, there is no need for pre-configuring a user profile to the service provider either by the user registering herself or by the organisation of the user registering the user to the service provider.

Figure 3:
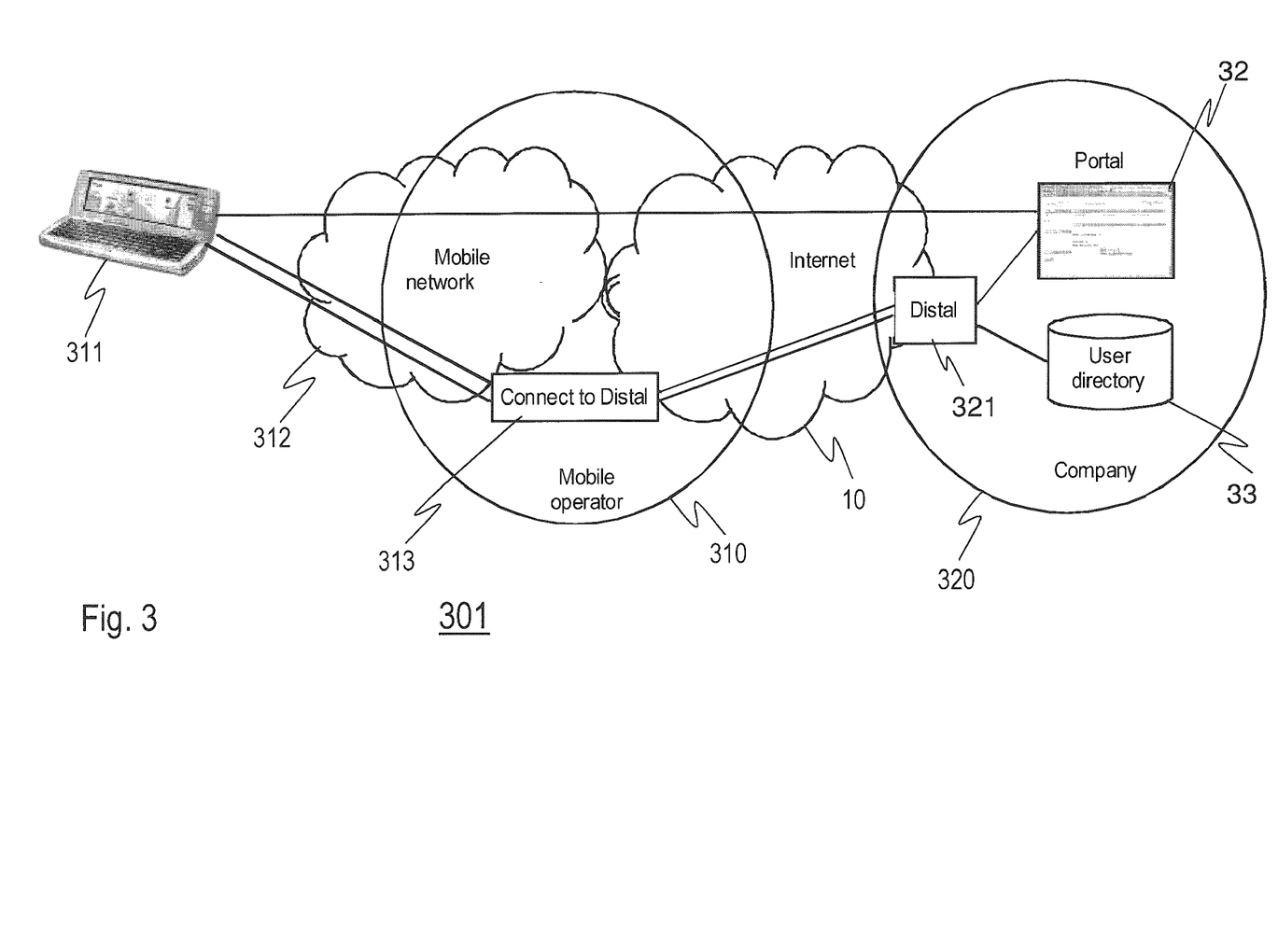
FIG. 3 shows a system according to a second embodiment.

FIG. 3 shows a system 301 according to a second embodiment This embodiment is based on a concept that a mobile user attaches to various services via a gateway provided by a mobile operator. As such, the gateway has access to the user's subscriber details such as subscriber number. The system comprises a mobile operator 310 with a mobile subscriber 311 (that is, mobile equipment and cellular communications system subscription), a mobile network 312 for providing radio access for the mobile subscriber 311 and a mobile gateway 313 capable of running micro applications. The mobile operator 310, or mobile operator's network to be more specific, is connected to the Internet 10 for providing mobile users with an access to internet content. The system 301 further includes a service provider's network 320 having a mobile authorisation server 321, a service providing server 32 and a user profile database 33. The operation of the mobile system of FIG. 3 has the following main steps: A mobile user accesses a pointer such as a URL (provided by the operator, for example) and provides target URL such as http://auth.operator.com?targetUrl=distal.company.com. This URL invokes a micro application at the mobile authorisation server to determine the phone number (or other identifier) of the user and to forward that to the target URL. The micro application may supplement the identifier with further information in order to provide the mobile authorisation server with more information such as the user's organisational data, corresponding to the embodiment of the system of FIG. 1. Next, the mobile authorisation server 321 looks up the user from a user directory (e.g. AD or LDAP) and establishes an authenticated session to correct service, that is, to the service that the URL accessed by the user points to. The mobile authorisation server 321 then provides the mobile gateway 313 with data related to the authenticated session. The mobile gateway 313 relays said data to the mobile user 311 and the mobile user enters into the authenticated session directly with the service providing server 32.

To enhance data security, the communications between servers of different organisations (or domains) advantageously employ ordinary cryptographic measures including encrypting the data exchanged, using cryptographic signatures and ensuring the integrity of messages exchanged between the servers. For instance, the communications between the script server 24 and the authorisation server 31 can be sent in a protected manner using HTTPS protocol. Hence, no new cryptographic or other possibly heavy applications need to be necessarily incorporated into the script server, which results in easy deployment of the technology especially when it is desired to provide access to the authorisation server 31 from tens or hundreds of different networks.

Figure 4:
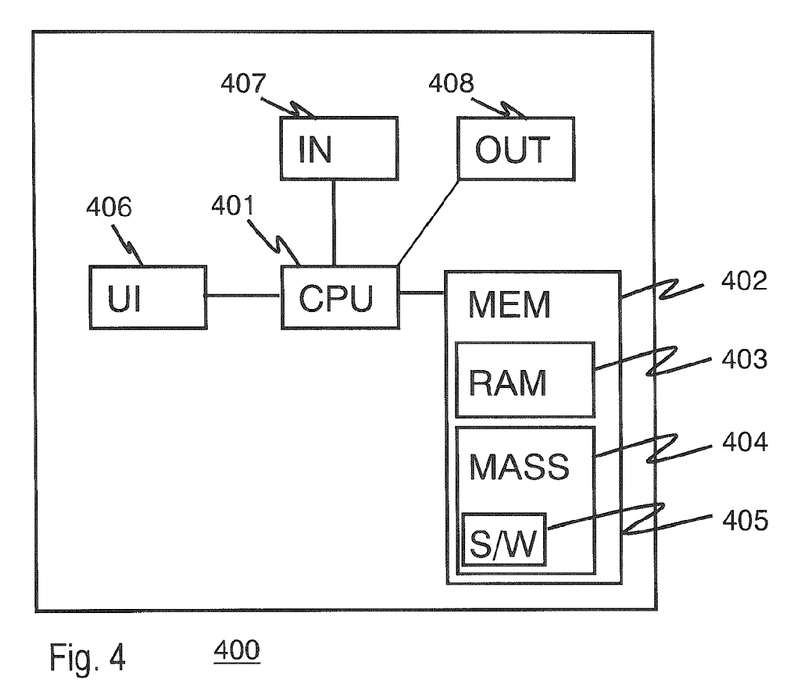
FIG. 4 shows a block diagram of a terminal suited for operating as a local user 21 and as a mobile subscriber.

FIG. 4 shows a block diagram of a terminal 400 suited for operating as a local user 21 and as a mobile subscriber. The terminal may be, for instance, based on a desktop computer, on a laptop computer or on a Nokia® communicator 9500 that has capability for internet access. The terminal 400 comprises a Central Processing Unit (401) for controlling the terminal, a memory 402 containing Random Access Memory as a work memory 403 and containing a mass memory 404 such as a hard disk or flash RAM that is functionally non-volatile type and includes computer program code or software 405. The software 405 includes instructions for the CPU 401 to control the terminal 400 such as an operating system and different computer applications. The terminal 406 further comprises a User Interface 406, a data input 407 such as a Bluetooth, LAN or WLAN receiver or a cellular or satellite data receiver and a data output 408 such as a Bluetooth, LAN or WLAN transmitter or a cellular or satellite data transmitter. The input and output may be also combined together into a common unit.

Figure 5:
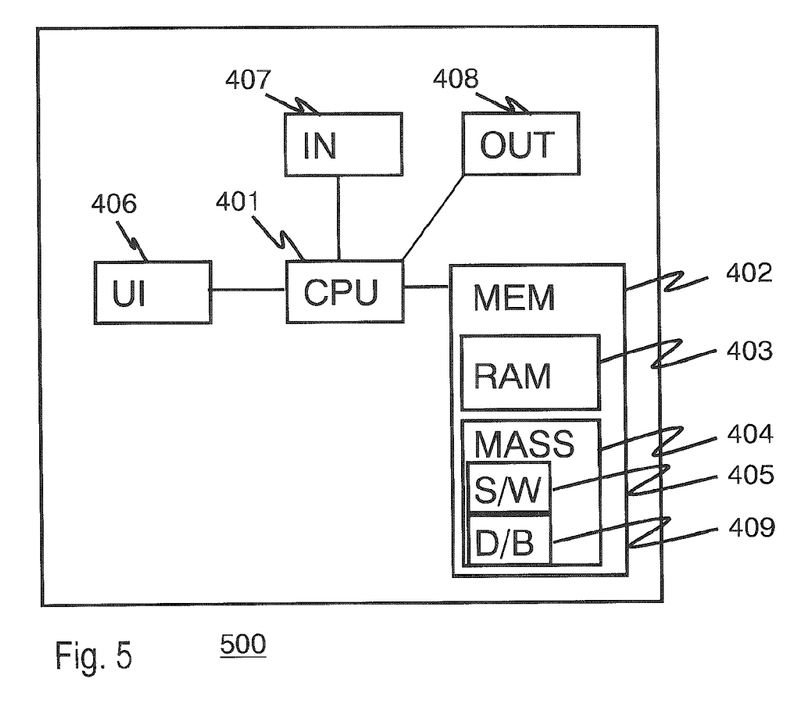
FIG. 5 shows a block diagram of a server suited for operating as any one of the servers according to embodiments.

FIG. 5 shows a block diagram of a server 500 suited for operating as any one of the servers according to embodiments. The server 500 is a typical server with possibly distributed functions, but aside scaling, it comprises similar parts CPU 401, memory 402, UI 406, input 407 and output 408 as the terminal 400. The server 500 may further comprise a built-in or distributed database 409 as a functional part of its memory 402.

Figure 6:
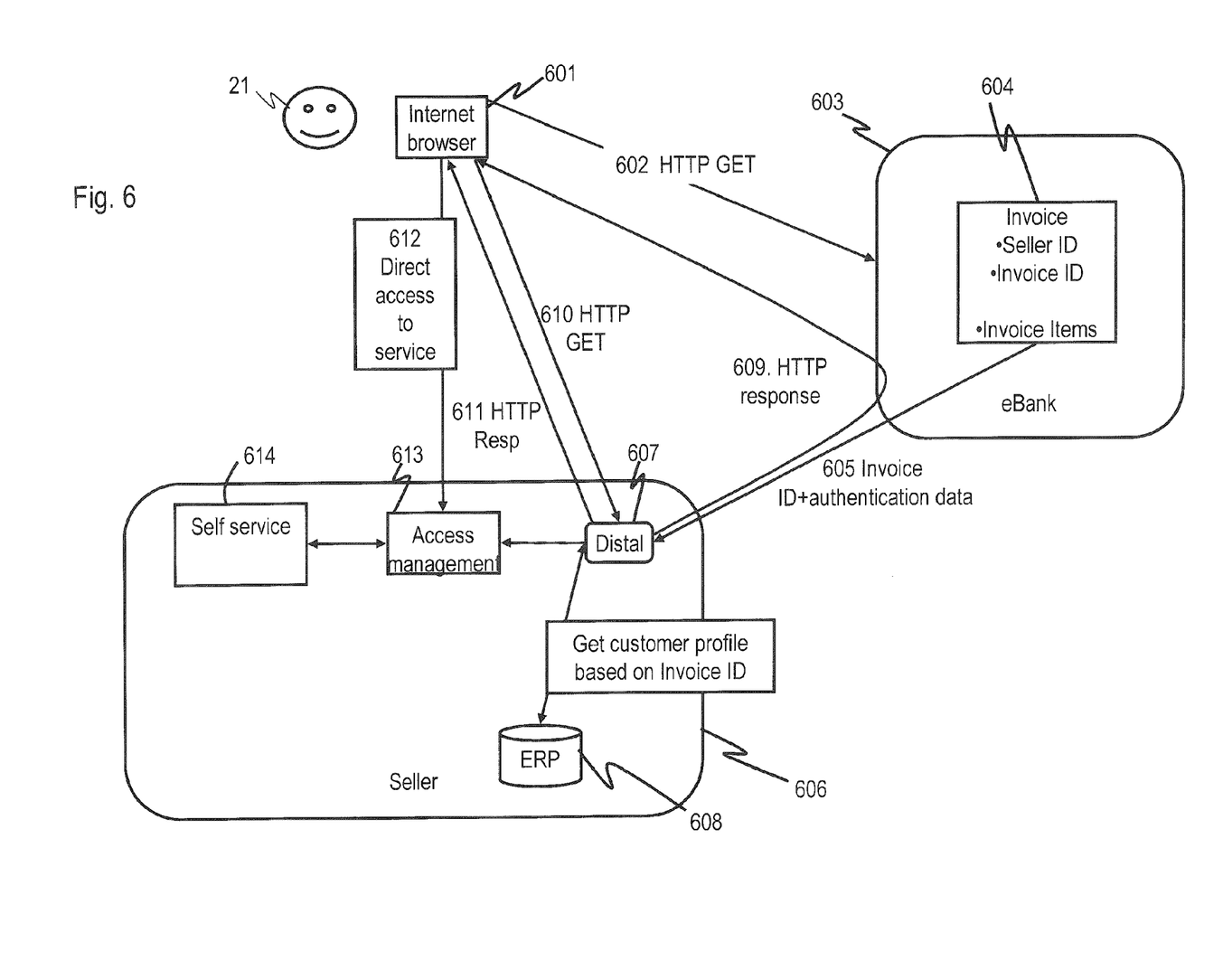
FIG. 6 shows a schematic diagram of a third embodiment.

FIG. 6 shows a schematic diagram of a third embodiment. FIG. 6 presents a user 21 with an internet browser 601 desiring to access a service provider such as a telephone operator, insurance company or energy supplier with which the user readily has a subscription and from which the user has an invoice. In this embodiment, the invoice number or other identity related to the invoice such as a bar code printed thereon is to be used as a reference using which the user will be authenticated to her service provider as will be next described with further detail. In common with the embodiment illustrated in FIG. 7 in which a phone number of the user is used to identify an existing user of the service provider and where authentication is based on the operator of the user, an internet access profile is created based on information derived from data provided by a home server to a foreign server (to service provider's distal server from a portal at mobile operator or e-bank). Very little data about the user is provided to the distal server.

The user 21 first browses with the browser 601 to the user's internet bank, eBank 603. The user 21 authenticates to the eBank 603 using known authentication methods, typically with a key exchange and provides the eBank 603 with a bank key. In the eBank 603, the user may perform normal transactions and additionally select to access the service provider for data update, subscription change or any other further services. At simplest, when a user is having a particular invoice 604 to be paid or viewing an account statement that itemises a given payment, the user clicks or otherwise indicates to the eBank 603 that the service provider should be safely accessed. This indication is illustrated by a service access request message 602 that may be sent using an HTTP or HTTPS GEr request, for instance. In response, the eBank checks the identity of the invoicer (e.g. seller ID) and sends to the invoicer's system 606 or more particularly to a distal server 607 a message 605 that includes the invoice identity (e.g. HTTP or HTTPS POST). Based on the trusted relationship with the eBank, the service provider or invoicer 606 may trust that the sender of the service access request 602 is indeed the person, or in some cases another person authorised by the person, to whom the invoice in question had been sent.

The distal server 607 next checks from an enterprise resource planning (ERP) system 608 the identity of the customer based on the invoice identity. Then distal server uses that customer identity to locate an existing user profile or create a new one. On the other hand, if the invoice identity does not match with the database of invoices, the service provider starts an error handling process in which it refuses to allow the user from accessing the service and possibly asks to check the invoice number.

Normally, the user is identified and the profile is either obtained or created. Then, the process continues by sending a service access response 609 to user or more particularly to the browser 601 with a temporary address to the distal server 607. Armed with the temporary address, the browser 601 then connects to the distal server 607 with a service access instruction request message to establish a secured session with the service provider. The distal server may then provide the browser 601 with the actual session particulars in a service access instruction message using which the browser next forms a direct access 612 to the service provider's access management function 613 that is informed of the user profile associated with the session particulars provided by message 610. The access management function then allows the user to access the service and do therein whatever the service provider allows a user to do with her own subscription: the user may change contract details, order further services, manage her contact data, and so on. The distal server is basically an authorisation server similar to distal 31 and enables a user to authenticate to the service without any preceding registration to the service or exchange of passwords simply via the eBank 603. The functionality required by this embodiment may be based on a script running in the eBank 603 and software in the distal server 607 so that the implementation is light both in technical and economical terms. Further, the access may be safer when common credentials are used with the eBank and the service provider as the amount of necessary authentication credentials is reduced in comparison to having to separately register to the service provider and to create a subscription with a dedicated password.

In an embodiment, the access management 613 also provides the user with permanent access credentials using which the user may directly connect to the service via the access management function 613 without first authenticating to the eBank 604 that acts as a portal in this example of the third embodiment. Further, it should be understood that instead of an internet bank, the portal may be any such server or service to which users are reliably authenticated. With an internet bank, there is the advantage that especially from electronic invoices directly sent to the bank from the service provider, it is very certain that the user who can access the invoice is that person whom the invoice concerns. Further in case of e-invoices, the user cannot enter an invoice number of another person which also removes the possibility of trying to guess a valid invoice number to illegally accessing others' service accounts.

Figure 7:
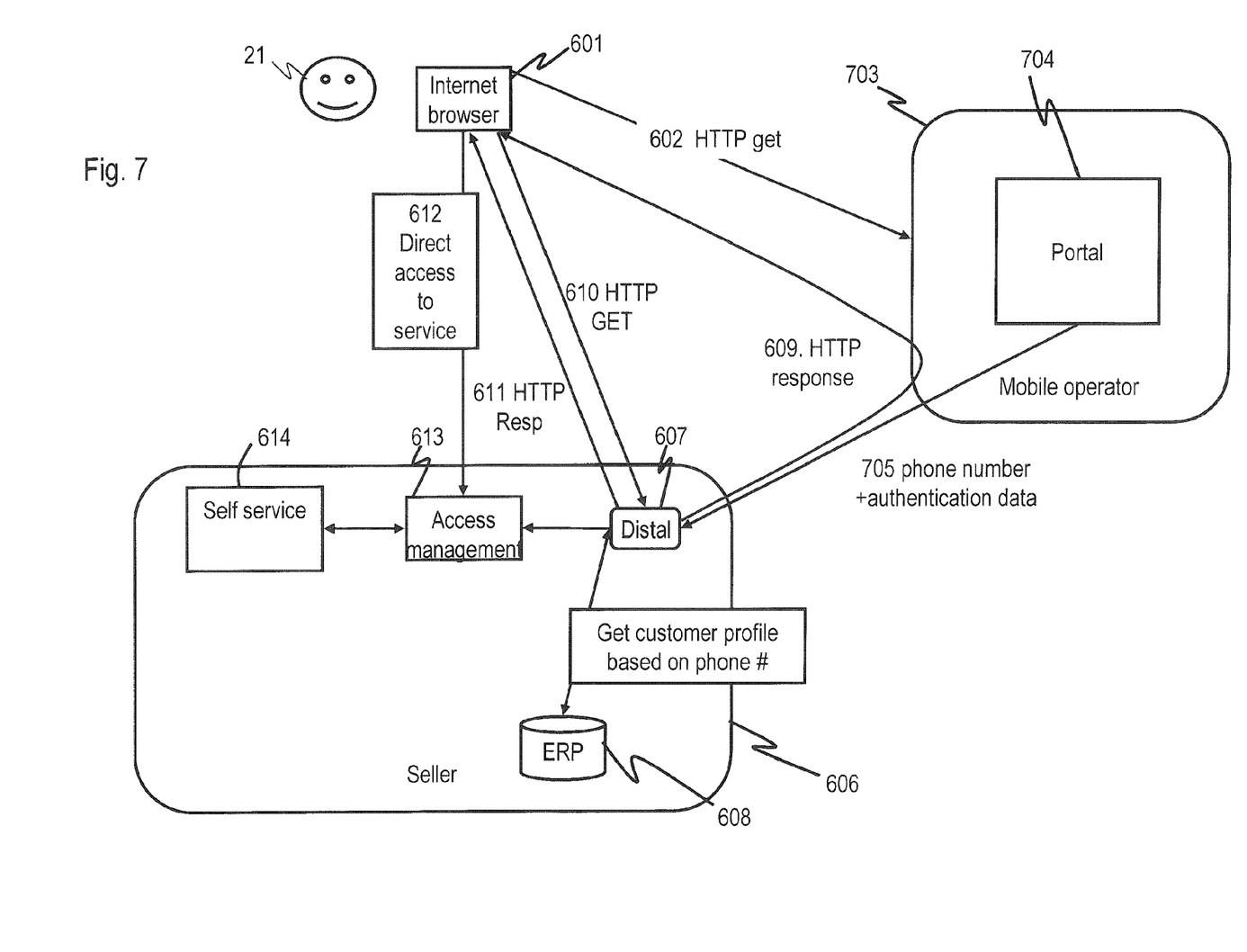
FIG. 7 shows a schematic diagram of a fourth embodiment.

FIG. 7 shows a schematic diagram of a fourth embodiment. FIG. 7 is identical with FIG. 6 except that instead of an eBank 603, there is a mobile operator 703 and instead of an invoice payment/review application 604, there is a portal 704 that enables the user to connect to her service provider by entering the name of the service provider or selecting the service provider from a predetermined list. Further, instead of using an invoice identity as a customer reference as in message 605 of FIG. 6, the phone number is provided for the same purpose in message 705. If the user has in her data within the ERP database 608 the same telephone number that the user uses in connecting to the portal 704, then the ERP database finds the user's customer profile and the distal may obtain an online access profile based on the customer profile or create the access profile if it is still missing and create a session plus steer the browser to directly accessing the service via the temporary address as explained in the foregoing with reference to FIG. 6.

As a brief abstract of an embodiment, users are authenticated using a home network user database to external service providers in a process in which a user logs into home network and starts accessing the external service by clicking on a link labelled for the external service provider. The link is directed to script at a home server. The script causes the home server to obtain details related to the user from a home network user database. The home server passes information related to the user to a foreign server associated with the service provider. Based on the passed information, the foreign server grants or denies authentication of the user to the external service. If granting, the foreign server provides the home server with access data and the home server forwards the access data to the user so that the user can initialise an authorised external service session using the access data. On granting access to the external service, the foreign server creates or maintains a profile that need not be a copy of a corresponding profile in the home server, but information derived thereof. For instance, an information technology outsourcing service provider may provide self service over the internet and the users of a customer may be classified into four groups: information management, office workers, travellers (who travel or live abroad) and domestic travellers (who travel in the home country). In an intranet of the customer, the users may be classified organisationally. Hence, the home server's profiles may not be suitable as such for use by the foreign server. Instead, if in the LDAP Distinguished Name of the user there exists a substring "OU=Foreign", the IT outsourcer may conversely create for that user a foreign traveller's profile. Generally, some of the profile data of the foreign server may be directly copied from the home server profile data and some other data may be derived based on organisation specific rules (it is appreciated that different organisations have different policies in how they classify and record user profiles in their home servers).

It should be appreciated that in this document, words comprise, include and contain are each used as open-ended expressions with no intended exclusivity.

Particular implementations and embodiments have been described. It is clear to a person skilled in the art that the disclosed embodiments are not restricted to details of the embodiments presented above, but that it can be implemented in other embodiments using equivalent means without deviating from the characteristics of the disclosed embodiments. For instance, embodiments may provide servers (home and/or foreign servers) that communicate with existing access management solutions like access managers, user directories, identity management solutions and similar to create, maintain and distribute user identities and tokens required to access services protected by such solutions. Hence, the scope of the disclosed embodiments are only restricted by the attached patent claims.

The invention claimed is:

1. A method comprising:
obtaining access for a user to an external service in a networked environment, wherein the user has access to a client that is capable of communicating with a home server of an organization in a first domain and with a foreign server in a second domain, the second domain being different from the first domain by:
detecting a request of the client in the home server;
maintaining in the home server, a shared secret common to the organization in the first domain and the external service, and an authentication script;
identifying in the home server, a pointer to the authentication script in the request;
responsive to the request, performing, in the home server, by the authentication script:
obtaining at least one detail related to the user, comprising an identifier that specifies the user within the organization;
passing, without intervention from the client, the at least one detail and the shared secret or a derivative of the shared secret from the home server to the foreign server;

receiving in the home server, without intervention from the client, redirecting information from the foreign server;

forming in the home server, based on the request and the redirecting information, a response to the client, the response being configured to redirect the client to a temporary address at which the client can obtain access data to the external service; and sending the response from the home server to the client.

2. A method according to claim 1, wherein the at least one detail comprises one or more particulars from a user profile of the home server.

3. A method according to claim 2, wherein the request comprises a Universal Resource Indicator (URI) or a Universal Resource Locator (URL).

4. A method according to claim 2, wherein the foreign server creates and maintains user profiles based on the at least one detail.

5. A method according to claim 2, wherein the obtaining of the at least one detail comprises accessing a database of personnel or members.

6. A method according to claim 2, wherein the redirection information comprises an address to the foreign server.

7. A method according to claim 1, wherein the access data is configured to enable the client to access the external service without intervention of the home server.

8. A home server of an organization, wherein the home server is in a first domain and configured for obtaining access for a user to an external service in a networked environment wherein the user has access to a client, the client being configured to communicate with the home server and with a foreign server in a second domain, the first domain being different from the second domain, the home server comprising:

a processor configured to detect a request of the client;

a memory for storing a shared secret common to the organization and the external service, and an authentication script;

the processor being configured to identify in the request, a pointer to the authentication script; and, responsive to the request, to perform by the authentication script:

obtaining at least one detail related to the user, comprising an identifier that specifies the user within the organization;

passing from the home server, without intervention from the client, the at least one detail and the shared secret or a derivative of the shared secret to the foreign server;

receiving from the foreign server, in the home server without intervention from the client, redirecting information;

forming in the home server, based on the request and the redirecting information, a response to the client, the response being configured to redirect the client to a temporary address at which the client can obtain access data to the external service; and sending the response from the home server to the client.

9. A home server according to claim 8, wherein the at least one detail comprises hashed derivative information.

10. A home server according to claim 8, wherein the request comprises a Universal Resource Indicator (URI) or a Universal Resource Locator (URL).

11. A home server according to claim 8, wherein the obtaining of the at least one detail comprises accessing a database of personnel or members.

12. A home server according to claim 11, wherein the redirection information comprises an address to the foreign server.

13. A home server according to claim 8, wherein the access data is configured to enable the client to access the external service without intervention of the home server.

14. A method wherein access is provided for a user to an external service in a networked environment wherein the user has access to a client that is capable of communicating with a home server in a first domain and with a foreign server in a second domain, the first domain being different from the second domain, wherein the home server is associated with a given organization, the method comprising:

receiving from the home server without intervention from the client, in a memory of the foreign server, triggered by a request from the client to the home server:

a) a shared secret common to the organization and the external service or a derivative of the shared secret; and b) at least one detail related to the user, comprising an identifier that specifies the user within the organization;

responsive to the receiving of the shared secret and the at least one detail, determining in a processor of the foreign server the organization associated with the home server, based on the shared secret; and responsively to a positive determination, the foreign server:

providing the home server with redirecting information configured to enable the home server to provide the client with a response configured to redirect the client to a temporary address;

establishing access data that enables the client to access the external service; and responsively to the client accessing the temporary address, providing the client with the access data.

15. A method according to claim 14, further comprising generating a temporary address for the user and containing the temporary address in the redirecting information.

16. A method according to claim 15, further comprising detecting an access communication from the client to the temporary address and responsively performing the establishing of the access data and of an authenticated session with the client.

17. A method according to claim 14, wherein the foreign server creates and maintains user profiles based on the at least one detail.

18. A method according to claim 17, wherein the foreign server derives the user profiles based on the at least one detail using a rule specific to the organization of the user.

19. A method according to claim 14, wherein the access data is configured to enable the client to access the external service without intervention of the home server.

20. A foreign server configured for providing access for a user to an external service in a networked environment wherein the user has access to a client that is capable of communicating with a home server in a first domain and with the foreign server in a second domain, the first domain being different from the second domain, wherein the home server is associated with a given organization, the foreign server comprising:

an input and an output configured to respectively receive and output data;

a processor configured to receive using the input from the home server, without intervention from the client:

a) a shared secret common to the organization and the external service or a derivative of the shared secret; and b) at least one detail related to the user, comprising an identifier that specifies the user within the organization;

responsive to the receiving of the shared secret and the at least one detail, the processor being further configured to determine the organization associated with the home server, based on the shared secret; and the processor being further configured to provide the home server with redirecting information configured to enable the home server to provide the client with a response configured to redirect the client to a temporary address;

the processor being further configured to establish access data that enables the client to access the external service, responsively to a positive determination; and the processor being further configured to, responsively to the client accessing the temporary address, provide the client with the access data.

21. A foreign server according to claim 20, the processor being further configured to generate a temporary address for the user and to contain the temporary address in the redirecting information.

22. A foreign server according to claim 21, the processor being further configured to detect an access communication from the client to the temporary address and to responsively perform the establishing of the access data and of an authenticated session with the client.

23. A foreign server according to claim 20, the processor being further configured to create and maintain user profiles based on the at least one detail.

24. A foreign server according to claim 23, the processor being further configured to derive the user profiles based on the at least one detail using a rule specific to the organization of the user.

25. A foreign server according to claim 20, wherein the access data is configured to enable the client to access the external service without intervention of the home server.

26. A computer program comprising computer executable program code stored in a non-transitory computer readable medium, the computer executable program code, when executed in a processor, being configured to control a home server of an organization in a first domain to obtain access for a user to an external service in a networked environment wherein the user has access to a client that is capable of communicating with the home server and with a foreign server in a second domain, the first domain being different from the second domain, the computer program comprising computer executable program code configured when run by the home server to:

detect a request of the client;

maintain a shared secret common to the organization and the external service, and an authentication script;

identify in the request a pointer to an authentication script; and responsive to the request, execute the authentication script to:

obtain at least one detail related to the user, comprising an identifier that specifies the user within the organization;

pass the at least one detail and the shared secret or a derivative of the shared secret from the home server to the foreign server, without intervention from the client;

receive in the home server, without intervention from the client, redirecting information from the foreign server;

form in the home server, based on the request and the redirecting information, a response to the client, the response being configured to redirect the client to a temporary address at which the client can obtain access data to the external service; and send the response from the home server to the client.

27. A computer program comprising computer executable program code stored in a non-transitory computer readable medium, the computer executable program code, when executed in a processor, being configured to control a foreign server in a first domain to provide access for a user to an external service in a networked environment wherein the user has access to a client that is capable of communicating with a home server and with the foreign server, wherein the home server is associated with a given organization in a second domain, the first domain being different from the second domain, the computer program comprising computer executable program code configured when run by the foreign server to:

receive in the foreign server from the home server, without intervention from the client, triggered by a request from the client to the home server:

a) a shared secret common to the organization and the external service or a derivative of the shared secret; and b) at least one detail related to the user, comprising an identifier that specifies the user within the organization;

responsive to the receiving of the shared secret and the at least one detail, determine the organization associated with the home server, based on the shared secret; and responsively to a positive determination:

provide the home server with redirecting information configured to enable the home server to provide the client with a response configured to redirect the client to a temporary address;

establish access data from the foreign server that enables the client to access the external service; and responsively to the client accessing the temporary address, provide the client with the access data.

* * * * *